Figure 1:
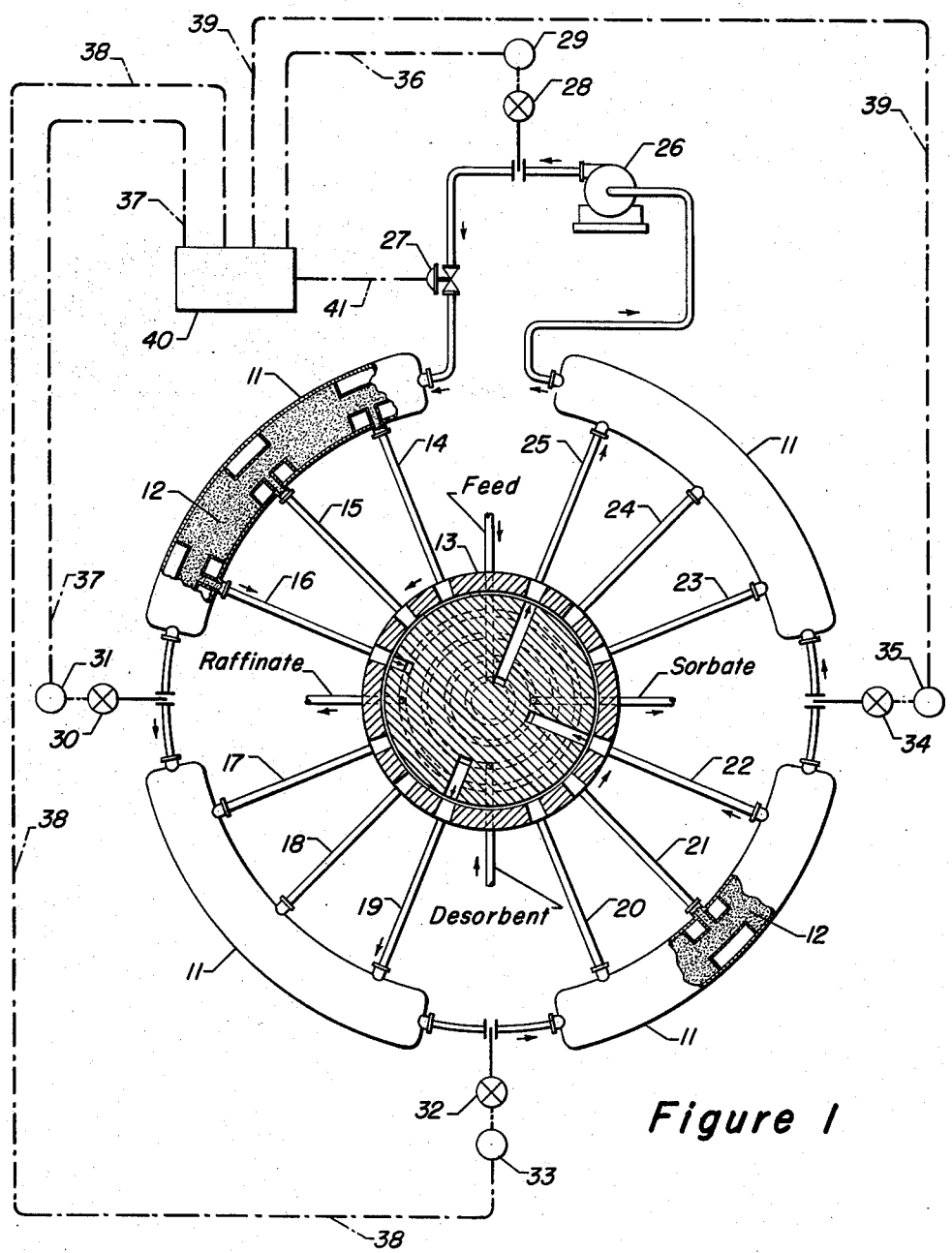

INVENTOR:
David M. Boyd Jr.
ATTORNEYS

Oct. 25, 1960  D. M. BOYD, JR  2,957,485
FLOW CONTROL SYSTEM
Filed May 11, 1959  3 Sheets-Sheet 3

INVENTOR:
David M. Boyd Jr.
BY:
Chester J. Giuliani
Philip J. Liggett
ATTORNEYS

United States Patent Office 2,957,485
Patented Oct. 25, 1960

2,957,485
FLOW CONTROL SYSTEM

David M. Boyd, Jr., Clarendon Hills, Ill., assignor to Universal Oil Products Company, Des Plaines, Ill., a corporation of Delaware Filed May 11, 1959, Ser. No. 812,516

10 Claims. (Cl. 137—14)

This invention relates to a method and means for selectively detecting and controlling the most extreme variable within a set of like variables which are subject to random or periodic independent change and which are uniformly responsive to a single final control element. More specifically, the present invention concerns the method and apparatus for sensing and controlling either the highest or the lowest instantaneous fluid flow rate existing within a plurality of serially connected flow-conducting zones wherein the various fluid flows are each subject to periodic upsets as a consequence of varying quantities of fluid being introduced to or withdrawn from said flow-conducting zones at regular or random intervals of time.

In one of its embodiments, this invention concerns a method of controlling the fluid flow in a continuous flow system wherein a variable fluid source supplies a moving mass of fluid to a primary conduit and wherein at least one secondary conduit carrying a fluid whose flow rate is periodically varied by independent means is connected to said primary conduit whereby said primary conduit is divided into at least two serially connected flow-conducting zones each subject to variations of fluid flow therein, said method comprising separately sensing the instantaneous flow rates existing within at least two of said flow-conducting zones and producing a resulting group of flow sensations corresponding to said flow rates, detecting in said group and selecting therefrom a single flow sensation corresponding to that flow rate which in the absence of control is the most extreme of all of said flow rates, and adjusting said variable fluid source responsive to said single flow sensation whereby its corresponding flow rate is maintained substantially at a predetermined level.

The novel control system of this invention is adapted specifically to meet the need for a unique method of controlling time variant fluid flow rates existing within a plurality of serially connected contacting beds, as exemplified by a recently developed continuous-cyclic sorption process involving the separation of hydrocarbons, and the present control system will first be discussed with reference to such a process. However, in the light of the following specification it will become apparent to one skilled in the art that this invention is by no means limited to a particular hydrocarbon separation process but is broadly applicable to any physical flow process having the essential flow pattern characterized by the continuous-cyclic sorption process hereinbelow described, namely, a number of serially connected flow-conducting zones wherein the flow rate in each is subject to periodic upsets by external independent means but the flow rates in all of said zones are substantially uniformly affected by, or responsive to, a single final control element such as a motor control valve or other automatically positioned flow regulating means.

It is well known in the art of separation processes that mixtures of compounds which are difficultly separable by distillation, crystallization, or extraction techniques may be readily resolved by contacting the mixture with a solid or solids which selectively combine in some form with at least one component of the mixture; the mechanism by which a component is selectively retained may be adsorption, absorption, clathration, occlusion or chemical reaction and all of these mechanisms are generically designated herein as "sorption" processes. A particularly desirable sorption process, one widely recognized in the art, involves the separation of mixtures of isomeric hydrocarbons by means of a solid particulate sorbent comprising a dehydrated metal aluminosilicate, commonly known as "molecular sieves." The separation may be readily effected by passing a mixture of iso and normal hydrocarbons over the sorbent whereby the normal hydrocarbon is sorbed by the sieves and an effluent or raffinate stream of substantially pure iso hydrocarbons is recovered. When it is desired to make a continuous process of this selective quality, it is necessary, in order to reuse the sieves and to recover the normal product or sorbate, to desorb the normal hydrocarbon from the sieves. This can be accomplished by subjecting the normal hydrocarbon saturated sieves to the influence of a preponderantly greater quantity of desorbent which is preferably a material capable of displacing the normal hydrocarbon from the sieves and which is readily separable from the normal hydrocarbon by fractional distillation.

A continuous process for separating iso from normal paraffins may be effected by employing a moving bed of sorbent which passes downwardly as a column from a sorption zone wherein the sorbent counter-currently contacts a rising stream of mixed iso and normal hydrocarbons, thereby sorbing the normal, to a desorption zone immediately below the feed point wherein the bed is contacted with a desorbent. A suitable column may have an intermediate feed point for the iso-normal mixture and a lower feed point for the desorbent operated in conjunction with an upper takeoff point for removing a mixture of iso hydrocarbons and desorbent and a takeoff point immediately below the feed point for removing a mixture of normal hydrocarbons and desorbent. The molecular sieves discharged from the bottom of the column must be lifted to the top and begin their descent to produce the effect of a continuously moving column passing downwardly through all zones. Although this system is very desirable because it yields a continuous product and it may be operated as a continuous process, it is very difficult to carry out in practice because the molecular sieves are physically fragile and are soon destroyed by the strains involved in a moving bed process.

It has been found that an essentially continuous sorption process may be effected by maintaining the sorbent in the form of a fixed elongated bed or series of discrete beds and moving the feed and product inlet and outlet points instead of attempting to move the bed itself. In this method the various inlet and outlet streams are charged and withdrawn respectively, in a continuous manner, without interruption, with respect to either the flow rate or composition of the several streams, the bed of solid sorbent remaining in substantially fixed position within the sorption column, the feed and desorbent inlets and the produce withdrawal outlets changing their position into and from the column in equal increments. Although the solid sorbent remains in fixed position, a simulated countercurrent flow arrangement is thereby established, since incoming feed is contacted at its point of introduction with sorbent relatively spent in comparison with downstream contacting zones; that is, the raffinate stream or least sorbed component of the feed stock is withdrawn from a bed in a series of sorbent "beds" constituting the sorption zone at the opposite end of the series from the feed stock inlet. This process may also be visualized as being carried out in a series of four interconnected zones of a single fixed bed of solid sorbent having no actual line of demarcation between each of the zones other than the zone boundaries defined by the points of inlet and withdrawal for the various fluid streams. The first and farthest upstream zone is referred to as a "sorption" zone, the next downstream zone is referred to as a "primary rectification" zone, the next adjacent downstream zone is referred to as a "desorption" zone and the farthest downstream zone is designated as a "secondary rectification" zone. The terms "upstream" and "downstream" are to be interpreted herein in their ordinary and usual definition in the chemical process arts; that is, the term "downstream" refers to an advanced point in the direction of flow relative to the point of reference, whereas "upstream" refers to a retrospective point in the direction of fluid flow. A fluid pump is provided between at least one pair of adjacent beds to provide a positive, unidirectional (downstream) flow of fluid which is the basic circulation flow maintained through the serially connected sieve beds in the absence of feed introduction and product withdrawal. One of the essential characteristics of the process is that a continuously flowing stream of fluid is circulated through the series of beds from the first to the last in series, at least two inlet streams being added to the continuously flowing fluid stream and at least two outlet fluid streams being withdrawn from the continuously circulating fluid, the outlet points alternating with the points of inlet.

In the steady state operation of this process it is obvious that the sum of the mass flow rates of the inlet streams must equal the sum of the mass flow rates of the outlet streams, but in general there will be disparities in the volumetric flow rates of the individual streams. These flow rates are added to or subtracted from the basic circulation flow rate through the beds so that the actual volumetric flow rate will be different in each of the four contacting zones; furthermore, since the points of entry and exit of the various streams move incrementally with time, the zones of minimum, intermediate and maximum flow rates are correspondingly shifted. When operating at a minimum basic circulation rate, that is, a circulation rate approximating the flow rate of one or more of the inlet or outlet streams, and in the absence of positive flow control, it is entirely possible that a greater quantity of material will be inadvertently withdrawn from a contacting zone than is added thereto, thereby causing a reversal of flow through the bed and destroying the effectiveness of the separation. In a less extreme situation even a materially reduced net flow may fall below the minimum necessary to maintain efficient sorption or desorption equilibria within the contacting zone. On the other hand, in the case of relatively difficult separations, it is frequently desirable to establish a maximum basic circulation rate, that is, a circulation rate substantially in excess of the flow rates of any of the inlet or outlet streams; in the latter case the problem is one of limiting to a predetermined level the maximum flow rate that can occur within any of the beds in order to avoid fluidization of the beds and resultant loss or destruction of the fragile sieves and also to avoid excessive pressure drop throughout the beds. Excessive pressure drop is particularly harmful in a liquid phase system involving the separation of light hydrocarbons where flashing or sporadic vaporization may take place; furthermore, when the available driving force or pressure drop is limited, as when a centrifugal pump is employed to provide the basic circulation flow and the pump discharge is throttled by a control valve, the greater the pressure drop through the sieve beds, the less pressure drop is available across the control valve, thereby reducing the sensitivity or "gain" of the control valve and resulting in erratic control of the circulating stream. Since the circulation rate is a critical variable in the operation of this sorption process and since it is subject to repeated disturbances, it is necessary to provide a control system which monitors the several critical flows existing within the system at any instant of time and which rapidly responds to the repeated flow upsets incurred whenever the points of exit and entry of the various streams are shifted.

It is, therefore, a principal object of this invention to provide a method and means for selecting either the highest or the lowest fluid flow rate existing within a plurality of serially connected flow-conducting zones and regulating the flow rates through all of said zones responsive to the selected flow rate.

It is another object of this invention to provide a method and means for maintaining a predetermined minimum flow rate within any one of a plurality of serially connected fluid-solid contacting zones each conducting a time variant fluid flow whereby unidirectional flow is assured and the danger of flow reversal is eliminated regardless of the frequency, magnitude, or direction of flow upsets imposed on the individual contacting zones.

Still another object of this invention is to provide a method and apparatus for maintaining a predetermined maximum flow rate within any one of a plurality of serially connected fluid-fixed bed contacting zones whereby the flow rate in any of said zones is kept sufficiently large to realize the desired contacting equilibria but is limited to the value below that rate which would cause fluidization of the fixed bed or excessive pressure drop.

Still another object of this invention is to provide a flow control system which continuously monitors a number of flow rates, regulates all of them in response to the most extreme, rapidly detects an upset or change in conditions which calls for a shift in the point of control, and effects such shift and stabilizes the controlled flow rate in minimum recovery time and without excessive oscillation, overpeaking or other detrimental transient effects.

Figure 2A:
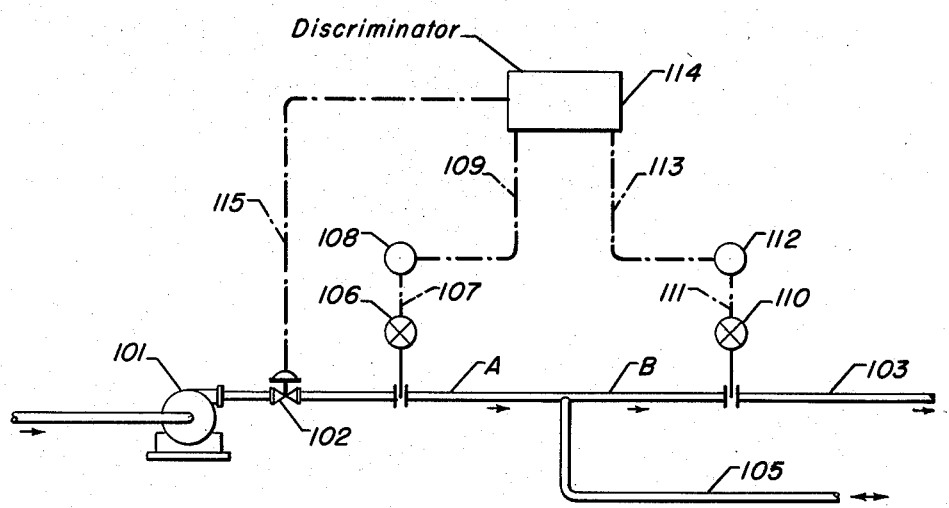
Figure 2B:
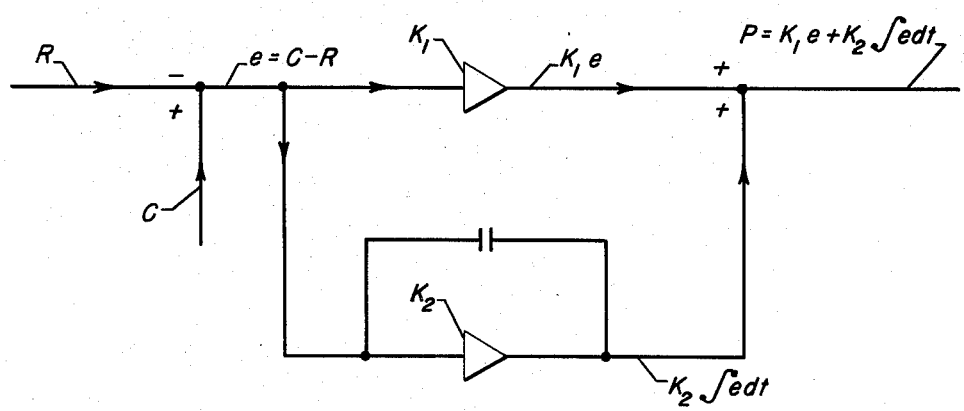

These and other objects of this invention will be apparent from the accompanying discussion and disclosure. Several embodiments of the present invention are shown in the accompanying drawings which, together with the description thereof, will serve to exemplify the invention; however, it is recognized that various modifications of the particular configurations illustrated can readily be made by the skilled artisan without departing from the broad scope of the present invention. Figure 1 illustrates a specific embodiment of the control system of this invention as employed in a continuous-cyclic selective sorption process of the class described. In Figure 2a there is shown a general embodiment of the control system of Figure 1 exemplifying only the essential elements thereof. Figure 2b is a signal-flow diagram of a typical controlling means suitable for use in the present invention. The graph of Figure 3 demonstrates the transient response of the control system of Figure 2a following a step upset. Figure 4 represents another general embodiment of this invention wherein the number of control elements required may be reduced.

In Figure 1 there is shown a flow diagram of a typical continuous-cyclic selective sorption process suitable for the separation of isomeric hydrocarbons from a mixture of iso and normal hydrocarbons, for example, the separation of isohexanes from normal hexanes. This particular separation is best effected entirely in the liquid phase and at substantially isothermal conditions. Four contacting chambers 11, each containing a plurality of molecular sieve beds 12, are connected in series with liquid pump 26 and motor control valve 27 to form a closed-flow path therethrough. Although contacting chambers 11 are herein shown diagrammatically as circumferentially spaced vessels, in actual practice they may comprise a series of vertically elongated contacting columns, the uppermost zone of one column being connected by conduit means to the uppermost or lowermost zone of the next succeeding column; or contacting chambers 11 may be combined to form a unitary elongated contacting column mounted vertically or horizontally. A suitable rotary distributing valve 13 simultaneously conducts four feed and product streams to and from the sieve beds respectively, rotating in the same direction (downstream) as the circulating liquid or carrier stream flows through the beds. A plurality of conduits, numbered consecutively 14 through 25, are arranged such that each connects a restricted portion between two adjacent beds 12 with a peripheral port of rotary valve 13. Each of conduits 14 to 25 inclusive conducts in turn (1) liquid to the beds, which will be feed stock or desorbent depending on the position of the rotary valve, (2) no flow at all for several (in this example, two) successive adjusted positions of the rotary valve when the conduit is blocked by the solid portions of the plug of valve 13, and (3) liquid from the beds, which will be either raffinate (isohexamer-containing stream) or sorbate (n-hexane-containing stream). Normally the rotary valve is held in an adjusted position of from about ½ to about 10 minutes, after which it is quickly advanced to its next adjusted position, thereby simultaneously shifting the points of entry and withdrawal of the feed and product streams in equal increments in a downstream direction relative to the carrier flow through the sieve beds. After the rotary valve has completed one revolution each of conduits 14 to 25 will have conducted, in turn, feed, sorbate, desorbent and raffinate. Through repeated revolutions of the rotary valve, a continuous-cyclic separation process is established.

When rotary valve 13 is in the position shown in Figure 1, the feed stream, consisting principally of a mixture of iso and normal hexanes, enters the contacting zone through conduit 25, joins the carrier liquid therein and flows downstream through pump 26, control valve 27, and a series of sieve beds 12 which constitutes the "sorption zone." In the sorption zone the feed stock contacts the molecular sieve sorbent which selectively sorbs the n-hexane component of the feed stock into its porous structure and selectively excludes the isohexane components thereof, the straight chain component being retained in the solid sorbent while the branched-chain component is permitted to pass through the bed of sorbent. At the downstream end of the sorption zone only a mixture of isohexane and desorbent, which in this example is preferably normal butane, remains, and a portion of this mixture is withdrawn as raffinate through conduit 16 and valve 13 and may be sent to subsequent fractionation facilities. The next series of beds downstream from conduit 16 constitutes the "primary rectification zone" wherein the remaining carrier liquid undergoes a secondary separation whereby the isohexanes are concentrated in the first few beds immediately succeeding the raffinate withdrawal point. Thus only essentially pure n-butane is present in the carrier liquid leaving the primary rectification zone, and to this stream is added fresh desorbent (n-butane) via conduit 19. The next series of sieve beds downstream from conduit 19 forms the "desorption zone" wherein a preponderance of desorbent displaces from the pores of the molecular sieve sorbent the n-hexane component previously sorbed from the feed stock in a prior cycle of operation. At the end of the desorption zone a portion of the circulating liquid, which now comprises mainly n-hexane and n-butane, is withdrawn as sorbate through conduit 22 and valve 13 and may then be sent to subsequent fractionation facilities. The last downstream contacting zone or series of sieve beds between conduits 22 and 25 serves as the "secondary rectification zone" wherein isohexamers previously retained by the sieves are washed out of the beds by the circulating carrier stream. At the end of the secondary rectification zone, the carrier liquid, now comprising mainly n-hexane, isohexanes and n-butane, is joined with feed stock entering the zone through conduit 25 and the closed flow path has now been traversed. Each of the above operations, which occur simultaneously, has been described with reference to the rotary valve position of Figure 1, that is, when feed stock enters the beds through conduit 25. As valve 13 is rotated the four zones hereinabove described also advance correspondingly; for example, the physical sieve beds which presently serve as the sorption zone gradually become, successively, the secondary rectification zone, the desorption zone, and finally the primary rectification zone, whereupon the cycle is repeated. Three of the four feed and product streams are independently flow-controlled by suitable control loops not shown in Figure 1 and the fourth stream is on back-pressure control.

The mechanism of the sorption process having been thus briefly described, the flow control system of this invention will now be discussed first with reference to the specific sorption process and then with respect to other aspects. It should be pointed out that all of the various control elements contemplated for use in this invention, namely, flow transmitters, controllers, and other apparatus to be more fully described hereinbelow, will be selected from conventional, commercially available instrumentation utilizing pneumatic, electronic or hydraulic signals which may be analog or digital in nature; since the internal functioning of the individual control apparatus is well known and forms no part of the present invention, a detailed analysis thereof is unnecessary and is therefore omitted from the specification to avoid undue prolixity.

Referring again to Figure 1, four flow transmitters 28, 30, 32 and 34 are separately associated with the conduits joining each of the contacting chambers 11 and are adapted to measure the instantaneous flow rates existing therebetween and to transmit signals responsive thereto. The transmitters may be conventional force-balance or motion-balance differential pressure instruments or head flowmeters utilizing an orifice, flow tube, venturi tube or Pitot tube installed in the conduit; equally satisfactory are area flowmeters or rotameters, propeller meters, or hot wire anemometers, these latter types of flow transmitters being installed directly in the conduit. Four flow controllers 29, 31, 33 and 35 each receive a flow signal from transmitters 28, 30, 32 and 34 respectively; the controllers may be remotely located, or locally mounted, or integral with the transmitting elements in which case the flow "signals" simply exist as a mechanical force, torque or movement of a linkage member connecting the sensing element with the controller mechanism. An essential feature of this embodiment of the invention is that all controllers must have integrating or automatic reset response. Each controller produces an appropriately modulated control signal which is a function of (1) the magnitude of the error between the measured flow rate and the desired flow rate as established by the controller setpoint, (2) the direction of the error, and (3) the time the error exists. The four control signals are transmitted via lines 36, 37, 38 and 39 to a discriminator 40.

The discriminator is an apparatus or group of elements designed to receive a plurality of separate input signals, to detect the most extreme, i.e., the highest or the lowest, and to transmit a single signal responsive to the most extreme signal while blocking the remaining input signals; these devices are sometimes referred to in the art as "override adapters" or "underride adapters" depending on whether their function is to detect and transmit the highest input signal or the lowest input signal respectively. A suitable discriminator for handling D.C. current or voltage signals is manufactured by The Swartwout Company; it comprises simply a plurality of parallel-connected cathode followers and is capable of receiving up to four input signals. If a greater number of inputs is required it is necessary only to connect three or more such units in an inverted pyramid network. An equivalent device operating upon conventional pneumatic signals may be constructed by employing one or more computing relays such as the "Nullmatic M/F" relays manufactured by Moore Products Company. The single output signal may be substantially equal to, or proportional to or a non-linear function of the selected input signal. A precise or definite mathematical relationship therebetween is immaterial to the present invention, it only being necessary that the output signal be responsive to changes in the selected input signal.

The output signal of the discriminator is transmitted to the final control element or motor control valve 27 via line 41. At any instant of time only one of the four controllers operates in a "closed loop," the other three being "open-looped" and, by virtue of the auto-reset action incorporated in the controllers, the outputs of the three controllers not in control will drive to saturation, i.e., achieve the highest or the lowest output which the controllers are capable of producing. This condition will prevail until the zone of most extreme flow rate advances sufficiently to affect the next downstream controller, causing the flow signal received thereby to cross the level of its setpoint and thus initiating a reverse integrating action which begins to drive its output in the reverse direction. At some time thereafter, which may be only a second or two depending upon the controller settings, the control output of the second controller will cross the control output of the controller presently in control, whereupon the discriminator will place the second controller in the closed loop and disconnect the first. During one complete revolution of distributing valve 13 each of the four controllers 29, 31, 33, 35 comes successively into control as the zone of most extreme flow advances.

To demonstrate more clearly the utility of this invention, the behavior of the sorption process without flow control will be compared to the operation of the same process using the flow control system of this invention.

*Example I*

With the feed and product stream conduits initially blocked in and the contacting chambers 11 and interconnecting conduits otherwise liquid-filled, pump 26 is started up and valve 27 is manually adjusted to establish a basic circulating flow rate of 150 units of flow, which may be g.p.h., g.p.m., b.p.d., etc. At this stage the flow rate is the same in each of chambers 11. Rotary valve 13 is positioned so that the feed stream will enter the system through conduit 25 as shown in Figure 1. The feed and product streams are then cut in with flow rates as follows:

| | Units |
|---|---|
| Feed in | 100 |
| Raffinate out | 130 |
| Desorbent in | 100 |
| Sorbate out | 70 |

The flow rates measured by the transmitters are now as follows:

| | Units |
|---|---|
| Transmitter 28 | 150 |
| Transmitter 30 | 20 |
| Transmitter 32 | 120 |
| Transmitter 34 | 50 |

After about one minute in this position, rotary valve 13 is advanced to its next adjusted position whereby the feed stream enters conduit 14, the other streams being correspondingly advanced. Valve 27 is readjusted, if necessary, so that the flow rate therethrough, as measured by transmitter 28, is maintained at its previous value of 150 units. The flow rates measured by the transmitters now become:

| | Units |
|---|---|
| Transmitter 28 | 150 |
| Transmitter 30 | 250 |
| Transmitter 32 | 120 |
| Transmitter 34 | 220 |

It is apparent that the zone of maximum flow has shifted from transmitter 28 to transmitter 30 and further that the magnitude of the maximum has increased by 100 units. Assuming that the desired method of operation is to limit the greatest flow to 150 units and to control it at that level, it is obvious that any control system which employs a fixed point of measurement, as for example, transmitter 28, would be totally unsatisfactory.

*Example II*

It is desired to limit the maximum flow rate in any of the four chambers 11 to 150 units of flow. The above described control system is commissioned and valve 27 is connected into the system whereby it is made responsive to the control signal carried by line 41. With the feed and product stream conduits initially blocked in and the contacting zones 11 and interconnecting conduits otherwise liquid filled, pump 26 is started up and a basic circulating flow rate of 150 units is established and automatically controlled by the flow control loop comprising transmitter 28, controller 29 and valve 27. The set points of controllers 31, 33 and 35 are also set at 150 units but their outputs are temporarily manually adjusted or otherwise disconnected from discriminator 40 to prevent premature triggering thereof. Rotary valve 13 is positioned so that the feed stream will enter the system through conduit 25 as shown in Figure 1. The feed and product streams are then introduced with flow rates as in Example I:

| | Units |
|---|---|
| Feed in | 100 |
| Raffinate out | 130 |
| Desorbent in | 100 |
| Sorbate out | 70 |

The flow rates measured by the transmitters are accordingly:

| | Units |
|---|---|
| Transmitter 28 (controller 29) (control point) | 150 |
| Transmitter 30 (controller 31) | 20 |
| Transmitter 32 (controller 33) | 120 |
| Transmitter 34 (controller 35) | 50 |

Controllers 31, 33 and 35 are now connected to discriminator 40 but since the measured flows associated therewith are all below the respective set points, these controllers will not assume control and controller 29 retains immediate control of valve 27. After about one minute in this position rotary valve 13 is advanced to its next adjusted position whereby the feed stream enters conduit 14, the other streams being correspondingly shifted. At the very instant the streams are transferred, the various flow rates will jump to those values listed in Example I, namely:

| | Units |
|---|---|
| Transmitter 28 (controller 29) (control point) | 150 |
| Transmitter 30 (controller 31) | 250 |
| Transmitter 32 (controller 33) | 120 |
| Transmitter 34 (controller 35) | 220 |

Now, however, the output of controller 31 rapidly changes through the effect of error reversal and auto-reset action; the output of controller 31 soon crosses the output of controller 29 and the discriminator output (line 41) becomes responsive to the output of controller 31, the output of controller 29 having no further effect on the control loop. Within a short time the flow is stabilized and controller 31 has assumed control. The flow rates measured by the transmitters are now as follows:

| | Units |
|---|---|
| Transmitter 28 (controller 29) | 50 |
| Transmitter 30 (controller 31) (control point) | 150 |
| Transmitter 32 (controller 33) | 20 |
| Transmitter 34 (controller 35) | 120 |

It is thus seen that the point of control is shifted whenever an upset occurs which calls for such a shift, namely four times per revolution of rotary valve 13. The point of control is in effect caused to follow the zone of maximum flow, and this flow is thereby maintained under direct automatic control and held at 150 units. The behavior of the system is identical when the operating criteria require a minimum flow to be selected and controlled.

Figure 2a illustrates the essential features of the control system of Figure 1. Fluid pump 101 and motor control valve 102 throttling the discharge of the pump together comprise a variable fluid source, that is, a means of supplying to primary conduit 103 varying quantities of fluid (liquid or gas) in response to an analog or digital control signal. Many other means of providing a variable fluid flow fall within the scope of this invention; for example, a controlled volume pump having an automatically adjustable stroke may be employed, or the energy input to the pump driver may be varied as by throttling steam to a turbine or pump steam chest, or the control valve may throttle a spill-back line from pump discharge to suction. Instead of a pump a fluid storage vessel maintained under pressure or at a higher elevation than conduit 103 may be employed, if desired. The essential requirement of the variable fluid source is that it supply varying quantities of fluid responsive to a control signal and in sufficient amount that the flow through the primary conduit into which it discharges is maintained unidirectional. In Figure 2a primary conduit 103 is divided into two serially connected flow-conducting zones A and B by secondary conduit 105; in more complex flow systems additional secondary conduits may be connected to conduit 103 whereby dividing it into more than two zones and additional flow controlling means may be provided therewith; however, in the interest of clarity only the minimum number of zones and controlling means are herein shown. The flow rate within conduit 105 is controlled by independent means not shown here and may be periodically directed into or out of conduit 103 at varying rates of flow, or at times there may be zero flow therein. The direction of flow in zones A and B is, however, maintained constant by the present invention and the magnitude of the flow rate in zones A and B is limited and controlled thereby. Flow transmitters 106 and 110 measure the flow rates within zones A and B respectively and transmit flow signals responsive to the flow rates via lines 107 and 111 to flow controllers 108 and 112 respectively. The controllers act upon the flow signals in accordance with the set points thereof, which are preferably substantially equal, to produce corresponding control signals which are transmitted by lines 109 and 113 to discriminator 114 which may be an override or underride control as hereinbefore mentioned. A discriminator output signal responsive to one of the control signals appearing on lines 109 and 113 is transmitted via line 115 to control valve 102. According to this arrangement either controller 108 or controller 112 is placed in the closed flow control loop at any instant of time, as determined by the most extreme flow rate presently existing in zones A or B. The controller not in control remains on an active standby basis ready to assume control in the event of a flow upset such as would occur, for example, when the direction of flow in secondary conduit 105 reverses.

All commercial controllers can be made either direct-acting or reverse-acting usually by a simple adjustment thereto. A direct-acting controller is one whose output increases when the magnitude of the measured variable exceeds the set point and decreases when the magnitude of the measured variable falls below the set point, in other words, a positive error results in an increase in the magnitude of the control signal and conversely for a negative error. A reverse-acting controller is one whose output decreases when the magnitude of the measured variable exceeds the set point and increases when the magnitude of the measured variable falls below the set point; in this case, a positive error results in a decrease in the magnitude of the control signal and conversely for a negative error. Similarly, motor control valves or other automatic flow regulating means are said to be direct-acting or reverse-acting; a direct-acting control valve, also referred to in the art as an "air-to-open" or "spring-closing" valve, is one which increases the fluid flow therethrough in response to an increase in the magnitude of the applied control signal; a reverse-acting control valve, also known as an "air-to-close" or "spring-opening" valve, is one which decreases the fluid flow therethrough in response to an increase in the magnitude of the applied control signal. The choice as to which type of control valve or other final control element should be employed is dictated, for reasons of safety, by the desired valve action upon accidental loss of the control signal. In order to obtain the requisite negative feedback in a flow control loop, it is necessary either to use a direct-acting controller in conjunction with a reverse-acting valve or to use a reverse-acting controller in conjunction with a direct-acting valve. These two basic control schemes give rise to four possible combinations of elements in the embodiment of Figure 2a. If controllers 108 and 112 are direct-acting, the larger of outputs 109 and 113 corresponds to the greater flow rate; however, if controllers 108 and 112 are reverse-acting, then the larger of outputs 109 and 113 corresponds to the lesser flow rate. Therefore, when it is desired to control the greater flow rate, two equally effective combinations of apparatus may be employed: first, direct-acting controllers may operate a reverse-acting final control element through an override control; alternatively, reverse-acting controllers may operate a direct-acting final control element through an underride control. In like manner, when it is desired to control the lesser flow rate, two other combinations of elements are available to achieve the latter objective: first, direct-acting controllers may operate a reverse-acting final control element through an underride control; second, reverse-acting controllers may operate a direct-acting final control element through an override control. Of course, these principles also apply without reservation where three or more measured flow rates are involved. The four combinations of control elements which may be employed in the embodiment of Figure 2a are summarized in the table below:

| Action | | | Controlled Flow |
|---|---|---|---|
| Controller | Discriminator | Final Control Element | |
| Direct | Override | Reverse | } Greatest. |
| Reverse | Underride | Direct | |
| Direct | Underride | Reverse | } Least. |
| Reverse | Override | Direct | |

Of course, even more combinations of elements are possible if other reverse-acting components are included in the closed loop, as for example, if the flow transmitters or discriminator are caused to be reverse-acting. Conventionally, flow transmitters are preferably direct-acting and no particular benefit is gained by further complicating the system in making them otherwise. In practice, therefore, the above four combinations will usually suffice to perform the required function.

Figure 2b is a signal-flow diagram of a typical controller suitable for use in the present invention and is intended to be illustrative rather than limiting upon the broad scope of this invention, which contemplates the use of any conventional pneumatic, electronic or hydraulic controllers operating with analog or digital information, for example, 3–15 p.s.i.g. air signals, 0–0.5 volt A.C. signals, 1–5 ma. D.C. signals, voltage or current pulses, and the like. Whatever information medium is utilized, conventional controllers generally comprise a reference input section wherein the magnitude of the controlled variable is compared to the desired magnitude and a resulting error signal is transmitted to one or more serially or parallel connected operational amplifiers which produce a modulated control signal responsive to the error signal. In Figure 2b R represents a reference input signal as established by the controller set point and may be a pressure, voltage, current, mechanical force, etc. C represents the controlled variable, specifically a flow signal, which, of course, must be compatible with the controller signal medium. As shown, R is subtracted from C to yield an error signal $e$, which is one way of obtaining a direct-acting controller; conversely, C may be subtracted from R, resulting in a reverse-acting controller. Error signal $e$ is fed to two parallel connected amplifiers; the first is a straight proportional amplifier having a gain $K_1$ and the second is an integrating amplifier having a gain or "reset rate" $K_2$. The outputs of the two amplifiers are then added to yield a control signal $P = K_1 e + K_2 \int e dt$. Many other arrangements are commonly used, for example, the integrating amplifier may be connected in series with and follow or precede the proportional amplifier, auxiliary feedback paths around either or both of the amplifiers may be included, etc. The values of $K_1$ and $K_2$ are adjusted for any particular application to give maximum control sensitivity consistent with closed loop stability. In the control of relatively fast systems, such as the flow process of this invention, $K_1$ generally has a value in the range of from about 2 down to about 0.5 or less and frequently it is so low that the contribution of the proportional amplifier to the total control signal P is negligible. The value of $K_2$, on the other hand, usually lies in the range of from about 5 to about 200 repeats/min. for flow control applications. Consequently in many flow control loops the proportional action of the controller may be omitted altogether, leaving only the integrating action as the essential controller response. The integrating response of most industrial controllers is obtained by a feedback path comprising a pneumatic resistance, an electric RC network, or other analogous resistance-capacitance networks, and the transient response of such feedback networks being exponential rather than linear, the output signal of such a controller is, therefore, only an approximate time integral of the error input signal. Where the error is small in magnitude and where it exists for a time short in comparison with the time constant of the feedback path, the controller output signal is restricted to variations over the initial linear portion of an exponential curve and is very nearly a true time integral of the error input signal. For substantial errors of significant duration, the controller response departs appreciably from the theoretical time integral response, but such behavior usually does not adversely affect the controllability of the overall closed loop of which the controller is a part and certainly is of no moment in the control of relatively fast flow systems. The effect of the integrating amplifier is to poduce a continually changing output signal P whenever an error signal $e$ of finite magnitude is present at the input terminals thereof, the overall closed loop being stabilized when the error signal is reduced substantially to zero and $C=R$. Because the sensitivity, repeatability, and freedom from hysteresis is limited by mechanical motion in the case of pneumatic and hydraulic controllers and to a less significant extent by component tolerances in the case of electronic controllers, error $e$ can never be reduced precisely to zero but only to a threshold value below which the integrating amplifier cannot detect or otherwise respond to a change in the input signal. However, since commercially available controllers having sensitivities better than 0.05% are not uncommon today, these limitations are of no practical consequence to the control of most industrial processes.

Figure 3:
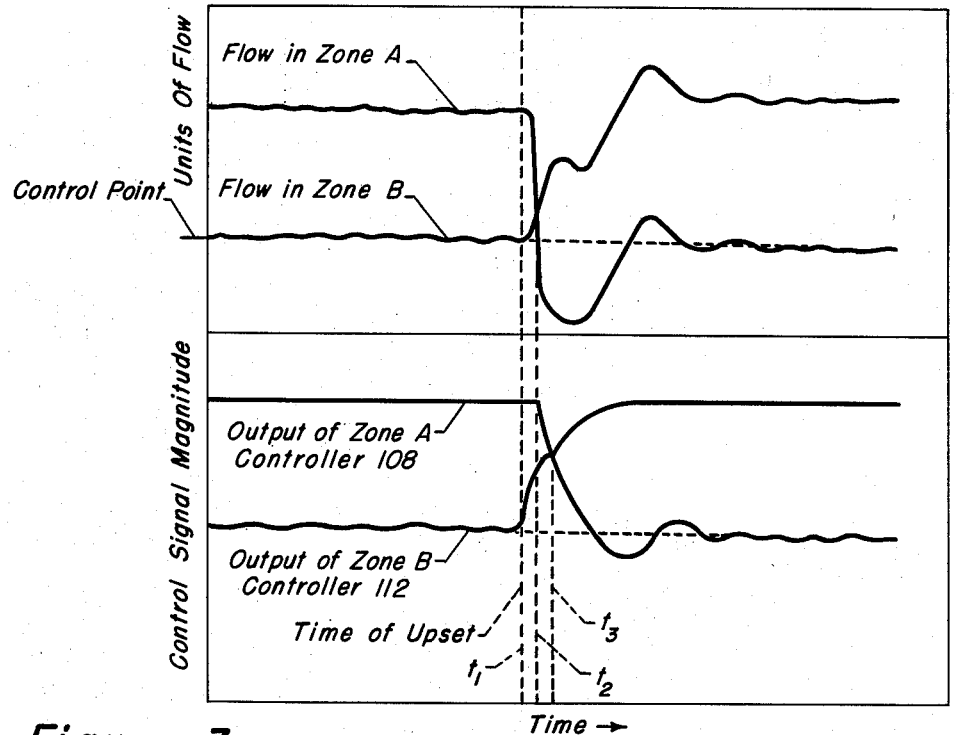
Figure 4:
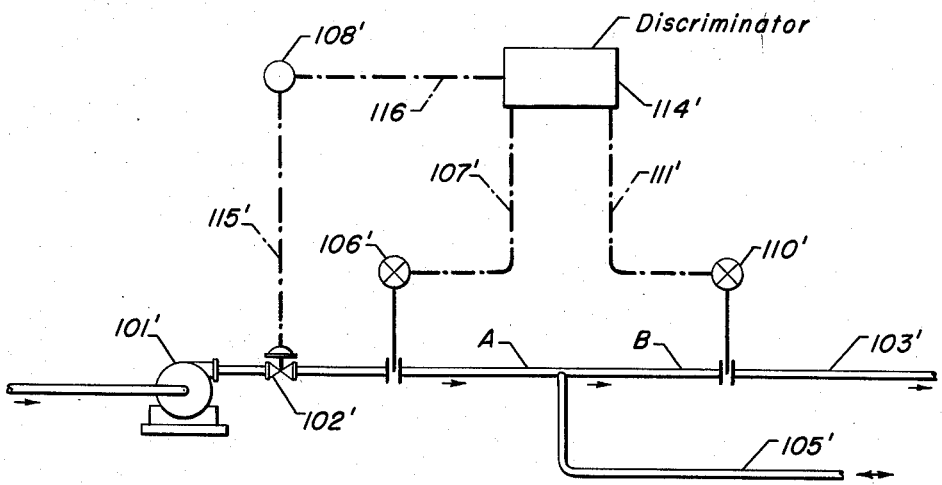

Figure 3 is a time record of the dynamic response of the control system of Figure 2a following a step upset in the flow rates within zones A and B. In the upper half of the graph the measured and controlled flow rates are shown, and in the lower half the output signals of the corresponding controllers are illustrated, both sets of variables being plotted against time on the abscissa. In this example controllers 108 and 112 are direct-acting and discriminator 114 is an underride control, whereby the lesser instantaneous flow rate governs. Both controllers have substantially the same set points. Prior to the time of upset $t_1$, the direction of flow in conduit 105 is away from conduit 103 so that the flow rate in zone B is less than in zone A, and the zone B flow prevails and is held at the control point by controller 112. Since the flow signal received by zone A controller 108 is above the set point or reference input thereof and the controller is direct-acting, the integrating action of controller 108 has previously driven its output to saturation; as long as the output of zone A controller 108 remains greater than the output of zone B controller 112, the underride unit will allow controller 112 to remain in control and will block the output of controller 108. At time $t_1$, the direction of flow in conduit 105 suddenly reverses and is now directed into conduit 103 so that the flow rate in zone B immediately commences to increase. The zone B flow rate will now be ultimately greater than the zone A flow rate since the flow through conduit 103 remains unidirectional. Usually such flow reversal causes a sharp decrease in the pressure drop across control valve 102, which in turn results in an immediate decrease in the zone A flow rate, although this phenomenon is by no means essential to the invention and operates solely to reduce the total stabilization time of the control system. Immediately following time $t_1$, controller 112 initiates corrective action, increasing its output in an attempt to restore the now greatly increased zone B flow rate to the control point. At time $t_2$, the zone A flow rate drops below the control point and the output of zone A controller 108 begins to decrease by virtue of its integrating or auto-reset response. At time $t_3$, the decreasing output of controller 108 crosses the increasing output of controller 112, whereupon the underride control open-loops controller 112 and places controller 108 in control. After several cycles of decreasing amplitude, the zone A flow rate is stabilized at the control point and is thenceforth subject to the direct control of controller 108. Meanwhile, since the zone B flow rate is now permanently above the set point of controller 112, the output thereof drives to saturation in the same manner as did the output of controller 108 prior to the time of upset. Controller 112 is thereby removed from control but remains on an active standby basis in the event of another flow reversal through conduit 105. While the above discussion has been confined to a specific combination of control elements, the same behavior obtains when the controllers are reverse-acting or when the greater flow rate is to be detected and controlled.

In some cases it may be desirable to maintain a different flow rate in zone A than in zone B and the set points of the corresponding controllers may therefore be different. Care must be taken here, however, with a view toward the anticipated magnitude and direction of the flow upset in one or more of the flow-conducting zones, to insure that in the ultimate steady-state condition of the flow system following the upset, the measured flow rates of all controllers except the one in control are either all greater than, or all less than, their respective set points; otherwise two or more controllers will be "flighting" for supremacy, thereby creating a manifestly chaotic condition of instability. It is also within the scope of this invention, but not necessary thereto, to provide flow indicating or recording means associated with one or more flow transmitters or controllers. A permanent record of each flow rate is often desirable as an aid in the operation of the above described selective sorption process.

A somewhat different assembly of apparatus capable of achieving most of the objectives of this invention is shown in Figure 4. As in the embodiment of Figure 2a, a variable fluid source consisting of pump 101' and control valve 102' supplies fluid to primary conduit 103' which is divided into two serially connected flow-conducting zones A and B by secondary conduit 105'. The fluid flow in conduit 105' may vary in both magnitude and direction. Flow transmitters 106' and 110' produce flow signals responsive to the instantaneous flow rates existing within zones A and B respectively, the flow signals being transmitted via lines 107' and 111' to discriminator 114' which may be an override or underride control. The discriminator transmits a signal responsible to the greatest or the least of flow signals 107' and 111' via line 116 to controller 108', which acts upon control valve 102' through control signal line 115'. With this arrangement only one controller is required, as opposed to the several controllers employed by the embodiment of Figure 2a. The flow transmitters may be direct-acting or reverse-acting and all the previously described combinations of control actions are available here. Since the discriminator receives the flow signals directly, rather than the modulated output signals of controllers, the shift in the control point following a flow upset occurs much more rapidly than in the system of Figure 2a, the shift time being limited only by the speed of response of the transmitters and not requiring the desaturation of a controller before the shift takes effect. Although considerable saving in cost can be realized through the use of fewer components, the control system of Figure 4 suffers several disadvantages which should be taken into consideration in applying this embodiment of the invention to a specific process. Because of the extreme sensitivity of the discriminator to small differentials between flow signals, this method is not satisfactory where two or more measured flow rates are fairly close together, as for example, when the flow rate in secondary conduit 105' is small in comparison with the flow rate in conduit 103'; in this situation the control system is "noise-sensitive," that is, a shift in the control point may be inadvertently triggered by spurious high-frequency noise peaks which are present in all flow measuring systems unless suitable dampening or filtering means are employed to attenuate the unwanted high frequency components of the flow signal, a procedure which necessarily sacrifices sensitivity and increases the response time of the flow transmitter. Also, where only a single controller is employed, some flexibility is lost in that staggered set points are not available and it is therefore impossible to control the flow rate at different levels for different flow-conducting zones; such limitation is of small consequence in the flow control of a continuous-cyclic sorption process, but conceivably could present a problem in the application of this embodiment of the invention to other continuous processes.

In view of the foregoing, it may be seen that the present invention provides an effective means for monitoring a plurality of time-variant fluid flows existing within a number of serially connected flow-conducting zones, and regulating all of said flows in response to the most extreme.

I claim as my invention:

1. In a continuous flow system wherein a variable fluid source supplies a moving mass of fluid to a primary conduit and wherein at least one secondary conduit carrying a fluid whose flow rate is periodically reversed in direction by independent means is connected to said primary conduit whereby said primary conduit is divided into at least two serially connected flow-conducting zones each subject to variations of fluid flow therein, the method of controlling fluid flow in said system which comprises separately sensing the instantaneous flow rates existing within at least two of said flow-conducting zones and producing a resulting group of flow sensations corresponding to said flow rates, detecting in said group and selecting therefrom a single flow sensation corresponding to that flow rate which in the absence of control is the most extreme of all of said flow rates, and adjusting said variable fluid source responsive to said single flow sensation whereby its corresponding flow rate is maintained substantially at a predetermined level.

2. The method of claim 1 further characterized in that said single flow sensation corresponds to that flow rate which in the absence of control is the greatest of all of said flow rates.

3. In a continuous flow system wherein a variable fluid source supplies a moving mass of fluid to a primary conduit and wherein at least one secondary conduit carrying a fluid whose flow rate is periodically reversed in direction by independent means is connected to said primary conduit whereby said primary conduit is divided into at least two serially connected flow-conducting zones each subject to variations of fluid flow therein, the method of controlling fluid flow in said system which comprises separately sensing the instantaneous flow rates existing within at least two of said flow-conducting zones and simultaneously producing a resulting group of flow signals responsive to said flow rates, detecting in said group and selecting therefrom a single flow signal responsive to that flow rate which in the absence of control is the greatest of all of said flow rates, and adjusting said variable fluid source responsive to said single flow signal whereby its corresponding flow rate is maintained substantially at a predetermined level.

4. In a continuous flow system wherein a variable fluid source supplies a moving mass of fluid to a primary conduit and wherein at least one secondary conduit carrying a fluid whose flow rate is periodically reversed in direction by independent means is connected to said primary conduit whereby said primary conduit is divided into at least two serially connected flow-conducting zones each subject to variations of fluid flow therein, the method of controlling fluid flow in said system which comprises separately sensing the instantaneous flow rates existing within at least two of said flow-conducting zones, simultaneously producing a resultant number of flow signals directly responsive to said flow rates and producing a like number of predetermined reference signals each associated with one of said flow signals, generating a group of corresponding control signals each being directly responsive to its respective flow signal and each comprising the approximate time integral of an error signal whose magnitude is equal to the difference between the corresponding flow signal and reference signal, detecting in said group of control signals and selecting therefrom the control signal of greatest magnitude, and adjusting said variable fluid source inversely responsive to said greatest control signal.

5. In a continuous flow system wherein a variable fluid source supplies a moving mass of fluid to a primary conduit and wherein at least one secondary conduit carrying a fluid whose flow rate is periodically reversed in direction by independent means is connected to said primary conduit whereby said primary conduit is divided into at least two serially connected flow-conducting zones each subject to variations of fluid flow therein, the method of controlling fluid flow in said system which comprises separately sensing the instantaneous flow rates existing within at least two of said flow-conducting zones, simultaneously producing a resultant number of flow signals directly responsive to said flow rates and producing a like number of predetermined reference signals each associated with one of said flow signals, generating a group of corresponding control signals each being inversely responsive to its respective flow signal and each comprising the approximate time integral of an error signal whose magnitude is equal to the difference between the corresponding flow signal and reference signal, detecting in said group of control signals and selecting therefrom the control signal of least magnitude, and adjusting said variable fluid source directly responsive to said least control signal.

6. The method of claim 1 further characterized in that said single flow sensation corresponds to that flow rate which in the absence of control is the least of all of said flow rates.

7. In a continuous flow system wherein a variable fluid source supplies a moving mass of fluid to a primary conduit and wherein at least one secondary conduit carrying a fluid whose flow rate is periodically reversed in direction by independent means is connected to said primary conduit whereby said primary conduit is divided into at least two serially connected flow-conducting zones each subject to variations of fluid flow therein, the method of controlling fluid flow in said system which comprises separately sensing the instantaneous flow rates existing within at least two of said flow-conducting zones and simultaneously producing a resulting group of flow signals responsive to said flow rates, detecting in said group and selecting therefrom a single flow signal responsive to that flow rate which in the absence of control is the least of all of said flow rates, and adjusting said variable fluid source responsive to said single flow signal whereby its corresponding flow rate is maintained substantially at a predetermined level.

8. In a continuous flow system wherein a variable fluid source supplies a moving mass of fluid to a primary conduit and wherein at least one secondary conduit carrying a fluid whose flow rate is periodically reversed in direction by independent means is connected to said primary conduit whereby said primary conduit is divided into at least two serially connected flow-conducting zones each subject to variations of fluid flow therein, the method of controlling fluid flow in said system which comprises separately sensing the instantaneous flow rates existing within at least two of said flow-conducting zones, simultaneously producing a resultant number of flow signals directly responsive to said flow rates and producing a like number of predetermined reference signals each associated with one of said flow signals, generating a group of corresponding control signals each being directly responsive to its respective flow signal and each comprising the approximate time integral of an error signal whose magnitude is equal to the difference between the corresponding flow signal and reference signal, detecting in said group of control signals and selecting therefrom the control signal of least magnitude, and adjusting said variable fluid source inversely responsive to said least control signal.

9. In a continuous flow system wherein a variable fluid source supplies a moving mass of fluid to a primary conduit and wherein at least one secondary conduit carrying a fluid whose flow rate is periodically reversed in direction by independent means is connected to said primary conduit whereby said primary conduit is divided into at least two serially connected flow-conducting zones each subject to variations of fluid flow therein, the method of controlling fluid flow in said system which comprises separately sensing the instantaneous flow rates existing within at least two of said flow-conducting zones, simultaneously producing a resultant number of flow signals directly responsive to said flow rates and producing a like number of predetermined reference signals each associated with one of said flow signals, generating a group of corresponding control signals each being inversely responsive to its respective flow signal and each comprising the approximate time integral of an error signal whose magnitude is equal to the difference between the corresponding flow signal and reference signal, detecting in said group of control signals and selecting therefrom the control signal of greatest magnitude, and adjusting said variable fluid source directly responsive to said greatest control signal.

10. In a continuous flow system wherein an automatically variable fluid source supplies a moving mass of fluid to a primary conduit and wherein at least one secondary conduit carrying a fluid whose flow direction is periodically varied by independent means is connected to said primary conduit whereby said primary conduit is divided into at least two serially connected flow-conducting zones each subject to variations of fluid flow therein, apparatus for controlling fluid flow in said system which comprises at least two flow sensing and controlling means separately associated with at least two of said flow-conducting zones, said flow controlling means each having automatic reset response and each producing a control signal responsive to the instantaneous fluid flow rate existing within the flow-conducting zone respectively associated therewith, signal discriminating means receiving said control signals and blocking all but the most extreme control signal and transmitting a signal responsive to said most extreme control signal to said automatically variable fluid source whereby said instantaneous flow rates are varied in response to the most extreme flow rate existing within any of said flow-conducting zones.

No references cited.